No. 743,026. PATENTED NOV. 3, 1903.
S. S. PHARR.
PLANTER.
APPLICATION FILED DEC. 19, 1901. RENEWED JUNE 23, 1903.
NO MODEL. 2 SHEETS—SHEET 1.
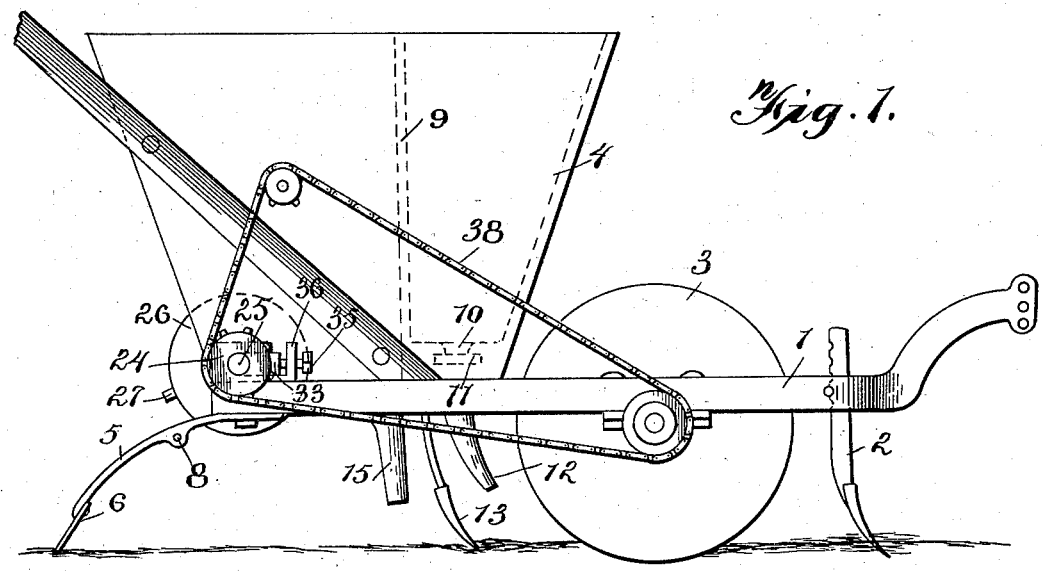
Fig. 1.
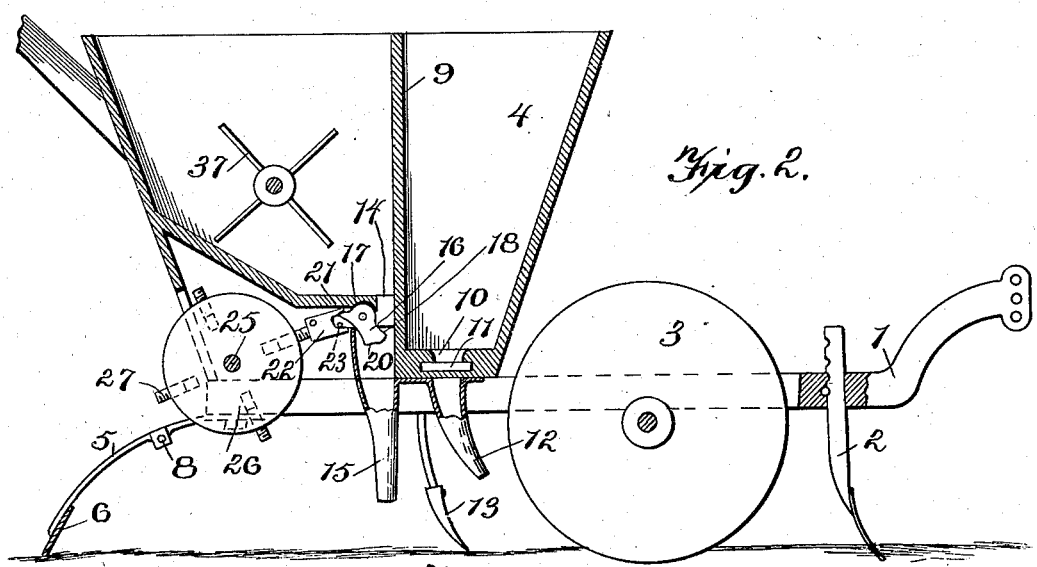
Fig. 2.
Fig. 7.
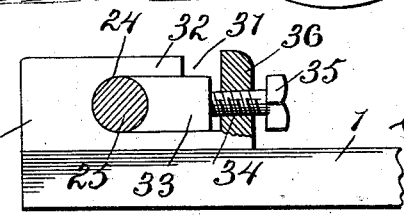
Witnesses
Geo. E. Puch.
J. R. Brown
Inventor
Sallie S. Pharr No. 743,026. PATENTED NOV. 3, 1903.
S. S. PHARR.
PLANTER.
APPLICATION FILED DEC. 19, 1901. RENEWED JUNE 23, 1903.
NO MODEL. 2 SHEETS—SHEET 2.
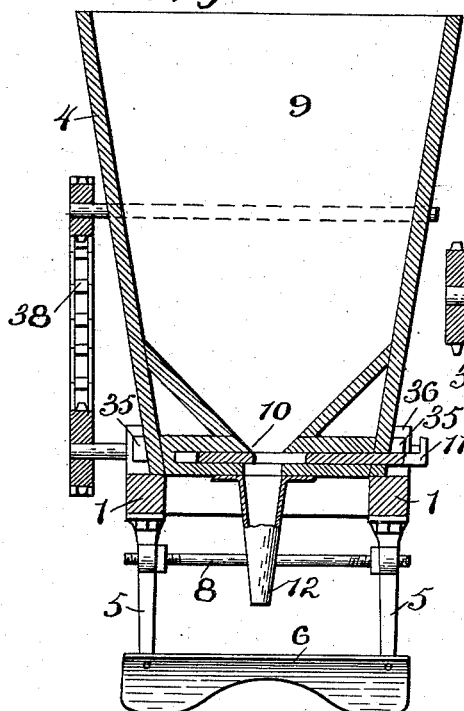
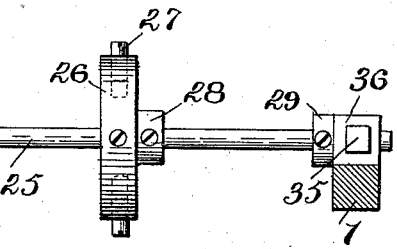
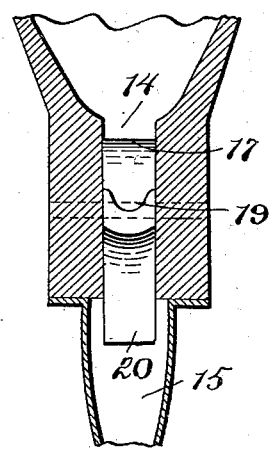
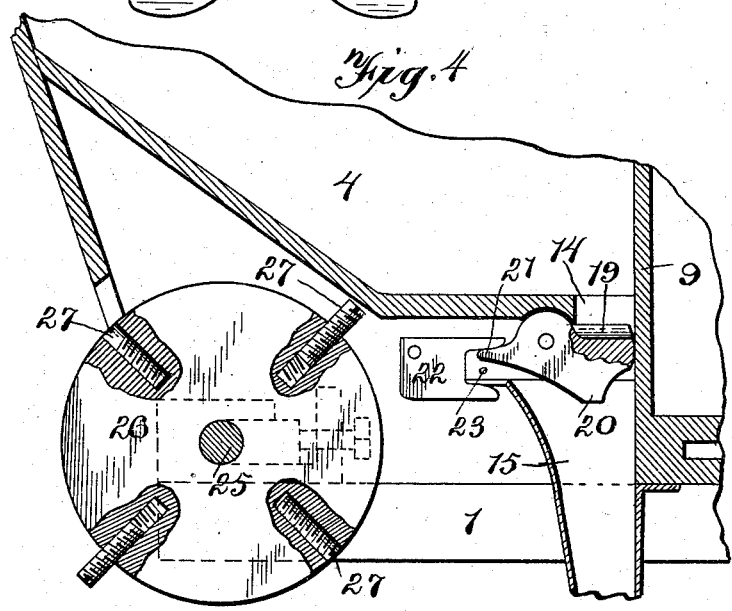
Witnesses
Geo. E. Frech.
J. R. Brown
Inventor
Sallie S. Pharr No. 743,026.  
Patented November 3, 1903.

UNITED STATES PATENT OFFICE.

SALLIE S. PHARR, OF MARSHALLVILLE, GEORGIA.

PLANTER.

SPECIFICATION forming part of Letters Patent No. 743,026, dated November 3, 1903.

Application filed December 19, 1901. Renewed June 23, 1903. Serial No. 162,783. (No model.)

*To all whom it may concern:*

Be it known that I, SALLIE S. PHARR, a citizen of the United States, residing at Marshallville, in the county of Macon, State of Georgia, have invented certain new and useful Improvements in Planters, of which the following is a description, such as will enable others skilled in the art to which it appertains to make and use the same, reference being had to the accompanying drawings.

My invention has relation to planters; and it consists in the novel construction and arrangement of its parts, as hereinafter described.

The object of my invention is to provide a planter of durable construction and having a seed-dropping mechanism of positive action and durable nature.

In the accompanying drawings, Figure 1 is a side elevation of the planter. Fig. 2 is a longitudinal sectional view of the planter. Fig. 3 is a transverse sectional view of the planter. Fig. 4 is a sectional view of the rear lower end of the hopper of the planter, showing the seed-dropping mechanism in detail. Fig. 5 is a rear view of the wheel and its supports for operating the seed-dropping mechanism. Fig. 6 is a sectional view of the bottom of the hopper, showing the end of the seed-dropper; and Fig. 7 is a side elevation, partly in section, of a special bearing for the shaft of the wheel for operating the seed-dropping mechanism.

The planter consists of the frame 1, having at its forward end the plow 2. The wheel 3 supports the forward end of the frame 1 and is adapted to follow behind the plow 2. The hopper 4 is mounted on the frame 1 in the rear of the wheel 3, and to the rear end of the frame 1 is attached the springs 5 5, to the lower ends of which is attached a covering-board 7, which may be used as shown in Fig. 3. When plow-points are used on the springs 5 5, the connecting-rod 8 may be used to spread the springs 5 5 to meet the requirements in covering the seed. The hopper 4 is divided by the partition 9 into two compartments, the forward one of which is for the reception of fertilizer and the rear one for the reception of the seed to be planted. In the bottom of the fertilizer-compartment is an outlet 10, having located transversely therein a slide 11, and below the said outlet 10 is a chute 12. The slide 11 is provided with a perforation which by manipulating the slide can be made to register with the outlet 10 in a manner as shown in Fig. 3, and the said slide may be so manipulated as to regulate the flow of the fertilizer from the compartment. Any suitable means may be employed to discharge the fertilizer, or it may be discharged by gravity.

The plows 13 are located behind the chute 12 and are adapted to cover the fertilizer deposited upon the ground with a thin layer of dirt, so that the seed will not come in direct contact with the fertilizer.

The bottom of the seed-compartment of the hopper 4 is provided with an outlet 14, which leads into the chute 15. Just below the outlet 14 is located the pivoted dog 16. Said dog consists of the semicircular portion 17, which enters a similar recess in the under side of the bottom of the hopper, and the pivoted point of the said dog is substantially concentric with the arc of the circle described by the said semicircular portion 17. The lip 18 of the said dog extends under the outlet 14 of the said hopper, said lip being provided in its upper edge with a longitudinally-extending groove 19. (See Fig. 6.) The under side of the lip 18 is weighted, as at 20, and the rear end of the said dog terminates in a shank 21. Immediately behind the dog 16 a tumbler 22 is pivoted near its upper rear corner. The forward end of said tumbler is bifurcated, a pin 23 passing transversely between the said bifurcations, as does also the rear end of the shank 21 of the dog 16.

At the rear end of the framework 1 the bearings 24 are located. The said bearings are adapted to receive the shaft 25, which carries the wheel 26. The wheel 26 is provided in its periphery with a number of threaded perforations adapted to contain the screws 27. The said screws 27 may be worked out in said perforations, so as to engage the lower rear end of the tumbler 22 as the wheel 26 is revolved, and thus operate the seed-dropping mechanism in a manner as will be hereinafter explained. The wheel 26 is held in place on the shaft 25 by means of a set-screw passing through the collar 28 and engaging the shaft, and a wheel of one style may be removed from the said shaft and another substituted in the place thereof. The shaft 25 and the wheel 26 are maintained in their proper positions by means of the collars 29, which bear against the inner sides of the bearings 24.

The bearings 24 consist of the horizontal portion 30, having in its interior a recess with the opening 31 leading into the same.

The shaft 25 is inserted into the bearing 24 through the opening 31 and is then passed back under the flange 32. A block 33 is then slipped laterally into the recess of the bearing, one end of the said block bearing against the shaft 25 and the opposite end of the said block having a detent 34 adapted to receive the end of the set-screw 35, the said set-screw passing through a threaded perforation in the perpendicular flange 36 of the said bearing.

The seed-compartment of the hopper 4 is provided with a revolving stirrer 37, the end of the shaft of which is provided with a sprocket-wheel. One end of the shaft 25 is provided with a sprocket-wheel, and one end of the shaft of the wheel 3 is also provided with a sprocket-wheel. Around these three sprocket-wheels the sprocket-chain 38 passes.

The planter operates as follows: The seed and the fertilizer are placed in their respective compartments in the hopper 4. The planter is then drawn along the ground. The plow 2 opens a furrow, and the fertilizer falls from the chute 12 into the said furrow, the plows 13 covering the fertilizer with a thin layer of earth. The wheel 3 runs in the furrow opened by the plow 2, and through the sprocket wheels and chain 38 the stirrer 37 and the wheel 26 are caused to revolve. As the wheel 26 revolves the ends of the projecting screws 27 come in contact with the lower rear end of the tumbler 22 and presses the same forward. This causes the said tumbler to move upward at its forward end, the pin 23 coming in contact with the lower bifurcation of the said tumbler and checking the upward movement. As the upper bifurcation is lifted off the shank 21 of the dog 16 the weight 20 of the said dog will cause the grooved lip 18 of the said dog to fall, and the seed carried in the groove 19 of the said lip is dropped into the chute 15, from whence it falls upon the earth-covered fertilizer in the furrow made in the ground. When the pin 27 passes the end of the tumbler 22, the weight of the forward end of the said tumbler will cause the said forward end of the tumbler to descend. The upper bifurcation engages the shank 21 of the dog 16, thus counterbalancing the weight 20 and causing the lip of the said dog to ascend and close the opening 14 in the bottom of the seed-compartment of the hopper 4, the plows 6 or the covering-board 7 closing the furrow over the seed as the planter passes.

The screws 27 in the wheel 26 may be increased in such numbers as to meet the requirements in planting either cotton, corn, peas, or other grain.

Having described my invention, what I claim as new, and desire to secure by Letters Patent, is—

1. In a planter a seed-dropping mechanism, consisting of a pivoted dog adapted to close the hopper-outlet, a pivoted tumbler engaging said dog, and maintaining the dog in its normal position and a means for operating the tumbler to cause the dog to tilt.

2. In a planter, a seed-dropping mechanism, consisting of a pivoted dog having a semicircular portion housed in a similar recess, in the bottom of the hopper, the pivotal point of the dog being substantially concentric with the arc of the circle of said semicircular portion, said dog adapted to close the hopper-outlet, a pivoted tumbler engaging said dog, and adapted to maintain it in its normal position, and a means for operating the tumbler to cause the dog to tilt.

3. In a planter, a seed-dropping mechanism, consisting of a pivoted dog, said dog having a lip adapted to close the hopper-outlet, with a weight located below said lip, a pivoted tumbler engaging said dog and adapted to maintain it in its normal position, and a means for operating the tumbler to cause the dog to tilt.

4. In a planter, a seed-dropping mechanism consisting of a pivoted dog adapted to close the hopper-outlet, said dog having a projecting shank, a pivoted tumbler having a bifurcated end the said shank of the dog passing between said bifurcations, and a means for operating the tumbler to cause the dog to tilt.

In testimony whereof I hereunto affix my signature in the presence of two witnesses.

SALLIE S. PHARR.

Witnesses:
   J. V. FREDERICK,
   S. M. TIMBERLAKE.